(12) United States Patent
Kamiyama et al.

(10) Patent No.: US 10,678,350 B2
(45) Date of Patent: Jun. 9, 2020

(54) ELECTRONIC PEN, ELECTRONIC PEN MAIN UNIT, AND METHOD FOR MANUFACTURING ELECTRONIC PEN MAIN UNIT

(71) Applicant: Wacom Co., Ltd., Saitama (JP)

(72) Inventors: Ryoji Kamiyama, Ibaraki (JP); Toshihiko Horie, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/113,491

(22) Filed: Aug. 27, 2018

(65) Prior Publication Data

US 2018/0364823 A1    Dec. 20, 2018

Related U.S. Application Data

(63) Continuation of application No. PCT/JP2016/086023, filed on Dec. 5, 2016.

(30) Foreign Application Priority Data

Mar. 1, 2016 (JP) ................. 2016-039113

(51) Int. Cl.
*G06F 3/0354* (2013.01)
*G06F 3/046* (2006.01)
*G06F 3/038* (2013.01)

(52) U.S. Cl.
CPC ........ *G06F 3/03545* (2013.01); *G06F 3/0383* (2013.01); *G06F 3/046* (2013.01)

(58) Field of Classification Search
CPC .... G06F 3/03545; G06F 3/046; G06F 3/0383; G06F 3/033
See application file for complete search history.

(56) References Cited

U.S. PATENT DOCUMENTS

2010/0212976 A1   8/2010   Baba
2013/0199311 A1*  8/2013   Horie ............... G01L 1/142
                                                    73/862.626
2016/0349865 A1   12/2016  Arai et al.

FOREIGN PATENT DOCUMENTS

JP    2010-198193 A    9/2010
WO    2015/122280 A1   8/2015

* cited by examiner

*Primary Examiner* — Dennis P Joseph
(74) *Attorney, Agent, or Firm* — Seed IP Law Group LLP

(57) ABSTRACT

An electronic pen has an electronic pen circuit and a core body disposed in a tubular external casing, and a circuit board that is disposed in the external casing and on which at least part of the electronic pen circuit is disposed. The electronic pen circuit and the circuit board are housed in a portion of a tubular internal casing housed in the external casing, and the core body is housed in the internal casing and the portion of the internal casing is filled with a resin in a state in which a tip part of the core body protrudes outside of the internal casing from a first opening of the internal casing on one side in an axial center direction of the internal casing.

15 Claims, 9 Drawing Sheets

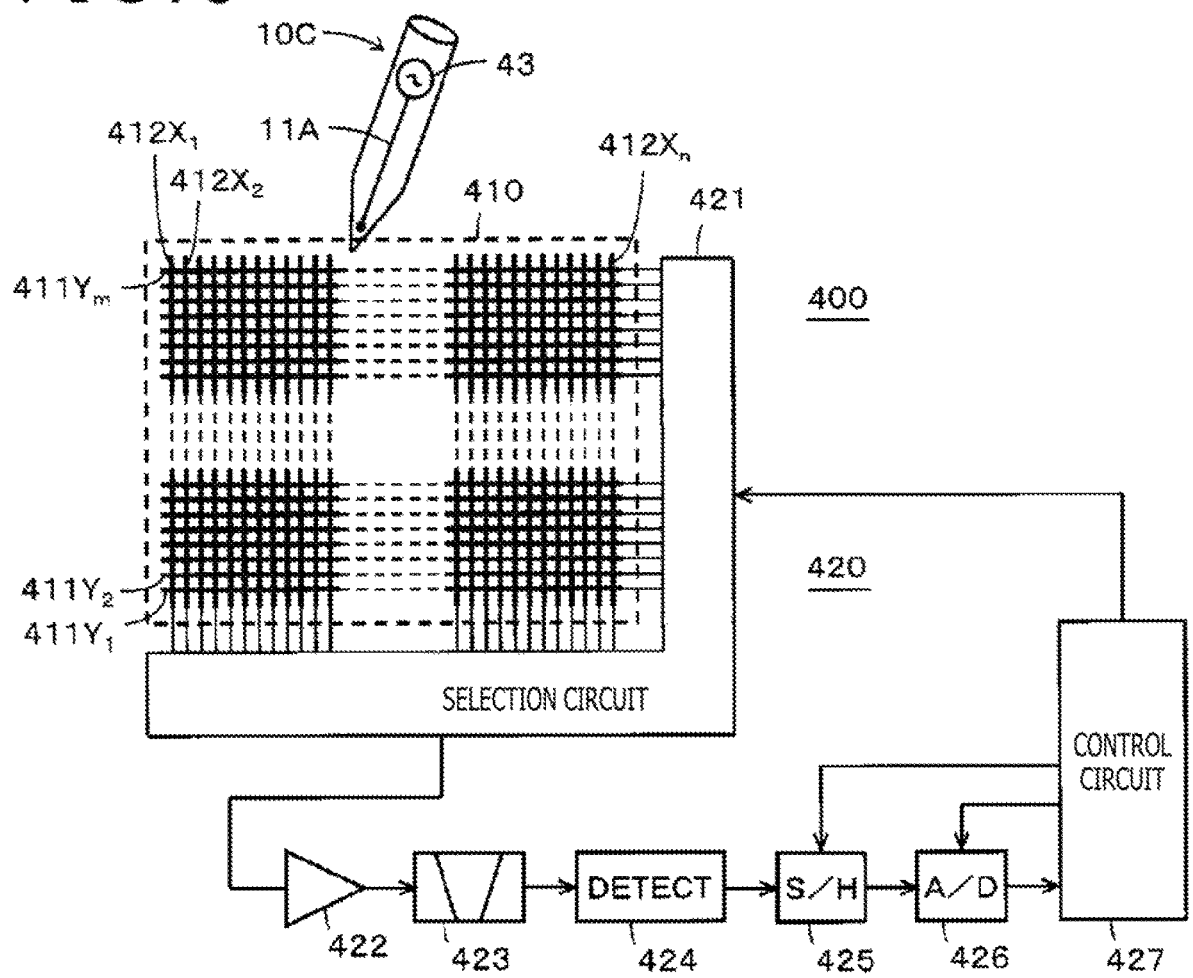

ELECTRONIC PEN, ELECTRONIC PEN MAIN UNIT, AND METHOD FOR MANUFACTURING ELECTRONIC PEN MAIN UNIT

BACKGROUND

Technical Field

The present disclosure relates to an electronic pen used with a position detecting device and particularly to an electronic pen made as a water-resistant electronic pen. Furthermore, the present disclosure relates to an electronic pen main unit housed in an electronic pen and a method for manufacturing the electronic pen main unit.

Background Art

In recent years, opportunities to use portable terminals, which have become popular, outside the room have been increasing due to convenience of portability. As special examples, the portable terminals are often used in environments involving a lot of dust and dirt, such as construction sites, and severe environments close to a water place. Furthermore, also in indoor use, the portable terminal is often accidentally dropped into water in a lavatory, kitchen, or the like. For this reason, demands for the portable terminals to have dust resistance and water resistance have been increasing and the portable terminals are coming to have such specifications as to be endurable in use even in the above-described severe environments.

Incidentally, recently, devices having an electronic pen and a position detecting device including a position detecting sensor have been used as input devices of the above-described portable terminals. In this case, the position detecting sensor is incorporated in the portable terminal and therefore has no problem about dust resistance and water resistance. However, the electronic pen is a device separate from the portable terminal and thus needs dust resistance and water resistance.

Specifically, small electronic components are used in the electronic pen and thus the electronic pen has a configuration susceptible to water. Furthermore, in the electronic pen of the electromagnetic induction system or the like, a coil wound around a magnetic core is used. However, the constant of the coil changes due to the influence of water, which causes a malfunction.

Therefore, the present assignee has already proposed JP 2010-198193A (Patent Document 1) regarding the dust resistance of the electronic pen and has proposed WO 2015/122280A1 (Patent Document 2) regarding the water resistance of the electronic pen. In Patent Document 1, the dust resistance is implemented by attaching a rubber cap between a core body and a casing. Furthermore, in Patent Document 2, a gap between an outer circumference of an opening in a casing on the pen tip side and a core body is closed by a packing made of rubber. In addition, an O-ring is used to close a gap between a component holding unit on the opposite side to the pen tip side of a casing and the casing. Thereby, the dust resistance and the water resistance are implemented.

However, in the case of using the packing made of rubber, the accuracy of the packing as a component is necessary. Furthermore, there is a problem that the performance changes depending on the degree of fastening of the packing and so forth. Moreover, in the case of detecting the writing pressure applied to the core body based on the displacement of the core body in the axial center direction, there is a possibility that the packing becomes a load on the displaced part (core body) and it becomes impossible to accurately detect the writing pressure. In addition, there is also a problem that the packing made of rubber deteriorates when being used for a long period and the effect of preventing dust and dirt and water attenuates.

BRIEF SUMMARY

The present disclosure intends to solve the above problems and provide an electronic pen having high performance of dust resistance and water resistance.

In order to solve the above-described problems, an aspect of the present disclosure provides an electronic pen including an electronic pen circuit and a core body disposed in a tubular external casing having a first end and a second end, the first end being opposite the second end, and a circuit board that is disposed in the external casing and on which at least part of the electronic pen circuit is disposed. The electronic pen circuit and the circuit board are housed in a portion of a tubular internal casing housed in the external casing, and the core body is housed in the internal casing and the portion of the internal casing is filled with a resin in a state in which a tip part of the core body protrudes outside of the internal casing from a first opening of the internal casing on a first side of the internal casing in an axial center direction of the internal casing.

According to the aspect of the present disclosure having the above-described configuration, the core body excluding the part serving as the tip part, the electronic pen circuit, and the circuit board on which at least part of the electronic pen circuit is disposed are housed in the hollow part of the internal casing. In addition, in the state in which they are housed, the portion of the internal casing is filled with the resin. That is, all components housed in the internal casing are molded by the resin and dust resistance and water resistance for the electronic components are sufficiently established.

Thus, an electronic pen that has high performance of dust resistance and water resistance and can be used also in water can be implemented. Furthermore, because a packing made of rubber and an O-ring like those in the related art are not used, there is an effect that problems like those explained at the beginning do not occur at all.

Furthermore, in the above-described aspect of the present disclosure, it is preferable to employ the following configuration. The electronic pen circuit includes a pressure detector which, in operation, detects a pressure applied to the tip part of the core body. The pressure detector is disposed near a second opening of the internal casing on a second side of the internal casing in the axial center direction of the internal casing adjacent to the second end of the external casing. The pressure detector detects the pressure applied to the tip part of the core body by detecting an electrical quantity that changes based on displacement of the entire internal casing toward the second end of the external casing according to the pressure.

According to this configuration, the pressure detector is disposed adjacent to the second opening of the internal casing on the second side of the internal casing in the axial center direction of the internal casing, and detects the pressure by detecting the electrical quantity that changes based on the displacement of the entire internal casing. Therefore, differently from the related art using a packing made of rubber, a load is not applied to the displaced part displaced for detection of the pressure (writing pressure) and the pressure (writing pressure) can be accurately detected.

According to the present disclosure, the core body excluding the part serving as the tip part, the electric pen circuit, and the circuit board on which at least part of the electric pen circuit is disposed are housed in the portion of the internal casing. In addition, in the state in which they are housed, the portion of the internal casing is filled with the resin and all components housed in the internal casing are molded by the resin. Therefore, dust resistance and water resistance for the electronic components are sufficiently established.

Furthermore, according to the present disclosure, an effect that special components for dust resistance and water resistance like those in the related art do not need to be used is achieved.

BRIEF DESCRIPTION OF THE DRAWINGS

FIG. 8 is a diagram depicting a circuit configuration example of a position detecting device used with the electronic pen according to the third embodiment of the present disclosure;

DETAILED DESCRIPTION OF THE PREFERRED EMBODIMENTS

Electronic pens according to embodiments of the present disclosure will be described below with reference to the drawings. First, an embodiment when the present disclosure is applied to an electronic pen of an electromagnetic induction system will be described.

[Configuration of Electronic Pen]

Figure 1:
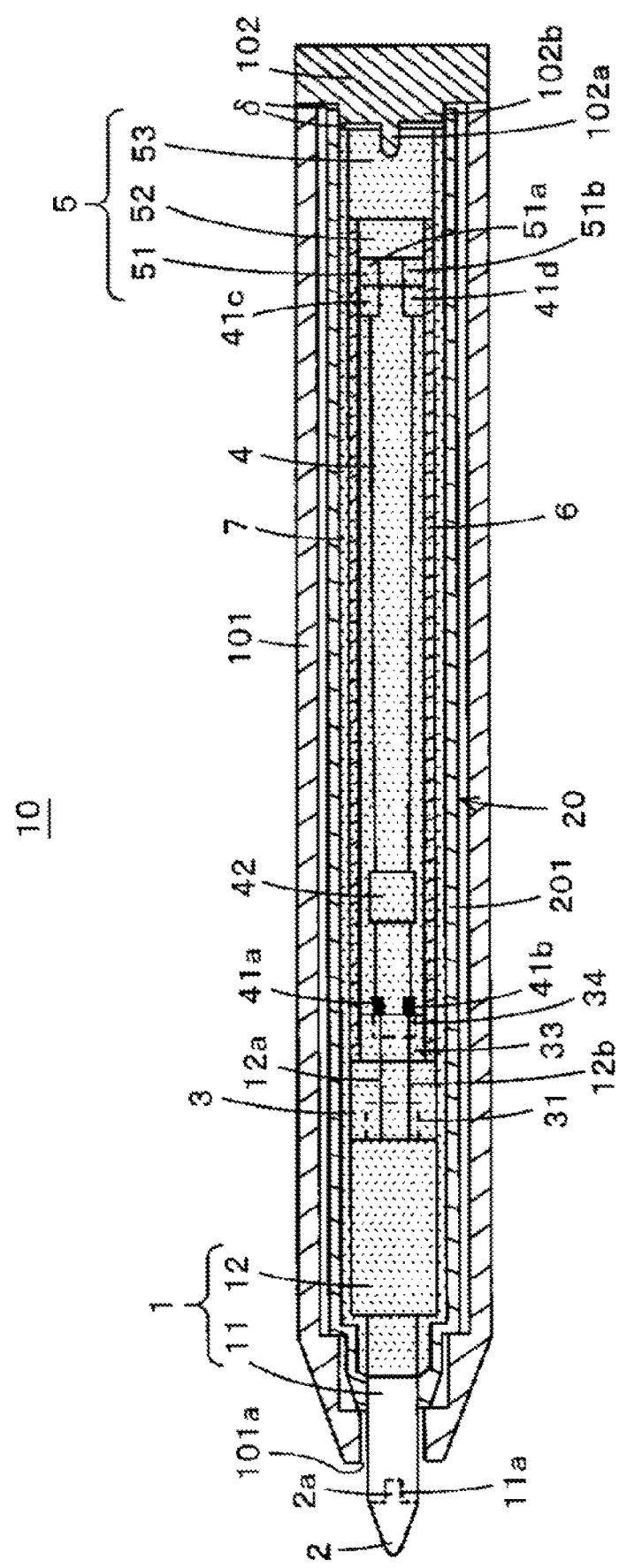
FIG. 1 is a diagram for explaining a configuration example of an electronic pen according to a first embodiment of the present disclosure.

FIG. 1 is a diagram for explaining a configuration example of an electronic pen 10 according to the embodiment of the present disclosure and is a diagram for explaining the overall outline of the electronic pen 10 of the present embodiment. The electronic pen 10 of the present embodiment is configured by housing an electronic pen main unit 20 in a hollow part of a tubular external casing 101 of the electronic pen 10 and closing the rear end side of the external casing 101 on the opposite side to the pen tip side by a casing lid 102.

In the present embodiment, the electronic pen main unit 20 has a configuration in which all of various kinds of components of the electronic pen except the tip part of a core body are housed in a hollow part of a tubular electronic pen main unit casing (internal casing) 201 as described later. In FIG. 1, the tubular external casing (case) 101 of the electronic pen 10 of the present embodiment and the tubular electronic pen main unit casing 201 of the electronic pen main unit 20 are cut to depict the inside of the respective hollow parts.

As depicted in FIG. 1, the electronic pen main unit 20 is a unit obtained by housing a coil unit 1 formed by winding a coil 12 around a magnetic core that doubles as the core body in this example, e.g. a ferrite core 11, a connecting member 3, a circuit board 4, and a writing pressure detector 5 as a pressure detector in the hollow part of the electronic pen main unit casing 201 and filling the hollow part with resin as described later. Here, the coil unit 1, the writing pressure detector 5, and so forth form part of the constituent components for implementing the functions of the electronic pen.

The ferrite core 11 doubling as the core body is formed into a solid rod shape that has a circular section and does not have a through-hole along the axial center direction in this example, and the coil 12 is wound around the opposite side to the part serving as the tip side of the core body. Furthermore, to the end surface of the part serving as the tip side of the core body of the ferrite core 11, a core body tip member 2 that is composed of e.g. a resin such as polyoxymethylene (POM) and has e.g. a circular cone shape is joined and attached. In the case of this example, a recess 11a is made at the center of the end surface of the part serving as the tip side of the core body of the ferrite core 11 and a protrusion 2a fitted to the recess 11a is provided on the bottom surface of the circular cone shape of the core body tip member 2. The protrusion 2a of the core body tip member 2 is press-fitted into the recess 11a of the ferrite core 11 and thereby the core body tip member 2 is fixed to the ferrite core 11. Both may be further bonded by an adhesive in order to prevent the core body tip member 2 from being detached from the ferrite core 11.

In the present embodiment, the coil unit 1 is housed in the electronic pen main unit casing 201 in such a manner that the part around which the coil 12 is not wound in the ferrite core 11 and the core body tip member 2 can protrude to the external from an opening 201a of the electronic pen main unit casing 201 and an opening 101a of the external casing 101 as depicted in FIG. 1. However, in this case, the coil unit 1 is housed in such a manner that at least the part around which the coil 12 is wound and the connection part between the coil 12 and the circuit board exist in the hollow part of the electronic pen main unit casing 201.

The circuit board 4 is fixed and held in a board protection pipe 6 formed of a hard tubular member. The connecting member 3 is a component for locking the coil unit 1 to the board protection pipe 6. In the present embodiment, the writing pressure detector 5 includes a connection terminal part 51 for a connection to the circuit board 4, a fitting part 52 to be fitted to the board protection pipe 6, and a pressure sensing part 53. The writing pressure detector 5 is joined to the board protection pipe 6 through fitting of the fitting part 52 to the board protection pipe 6.

Figure 2:
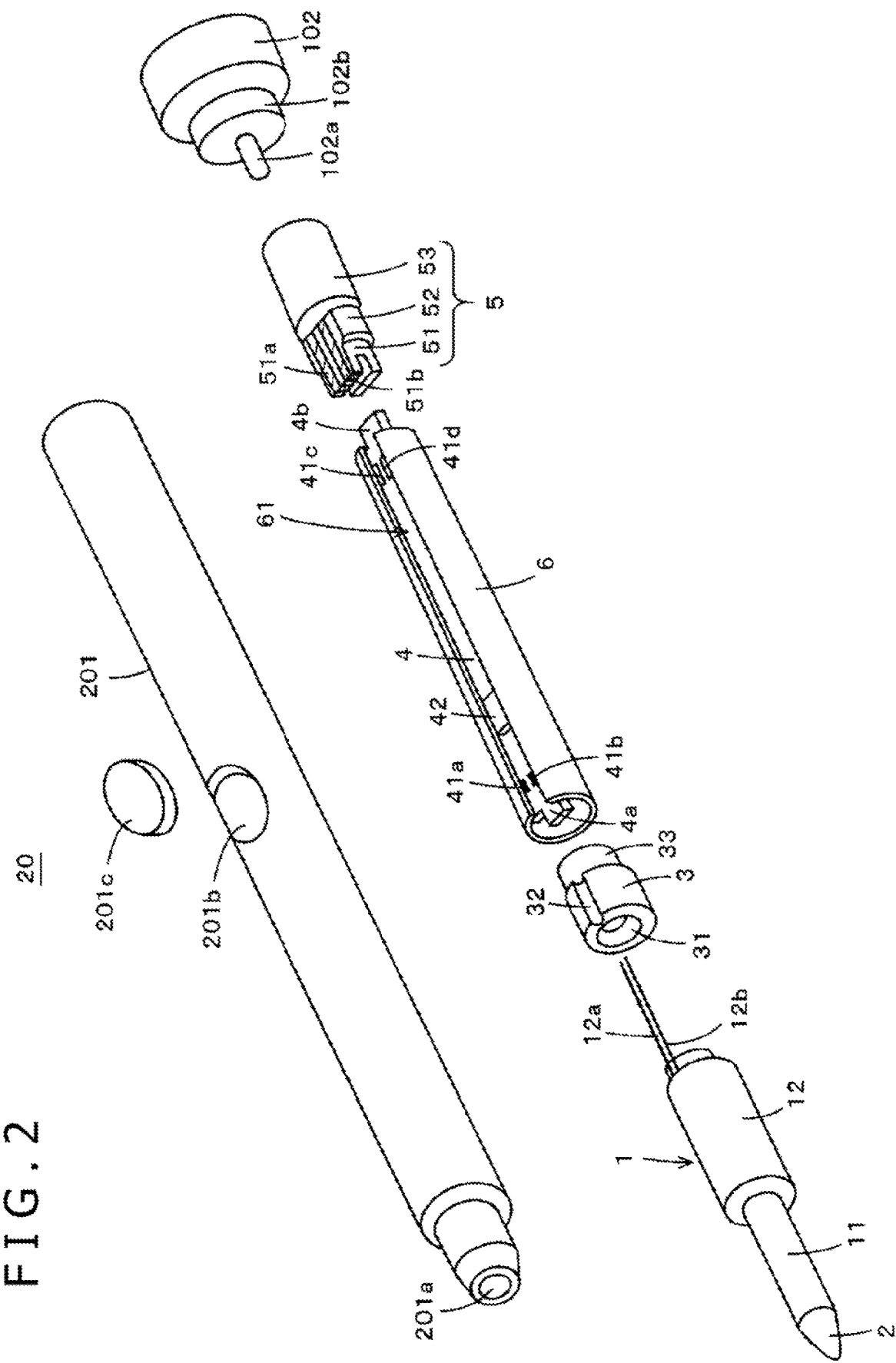
FIG. 2 is an exploded perspective view for explaining a configuration example of an electronic pen main unit that configures the electronic pen according to the first embodiment of the present disclosure.

FIG. 2 is an exploded perspective view for explaining the configuration of the electronic pen main unit 20. The coil 12 is formed by winding an insulated electric wire (coated conductive line) around the ferrite core 11. An extension line 12*a* of one end (winding start end) of the coil 12 and an extension line 12*b* of the other end (winding finish end) of the coil are led out to the opposite side to the side of the core body tip member 2.

A fitting recess 31 slightly larger than the diameter of the ferrite core 11 is formed in the opposed surface of the connecting member 3 to the ferrite core 11, and the configuration is so made that the ferrite core 11 is inserted in the fitting recess 31 and both are joined. Furthermore, in the connecting member 3, a concave groove 32 for housing the extension lines 12*a* and 12*b* of the coil 12 therein to prevent them from protruding from the outer circumference of the connecting member 3 is formed. Moreover, in the connecting member 3 on the side of the circuit board 4, a fitting part 33 formed of a small-diameter part having a diameter almost equal to the inner diameter of the board protection pipe 6 is formed. In the end surface of the fitting part 33 on the side of the circuit board 4, a fitting recess 34 (see FIG. 1) to which a protrusion 4*a* formed at an end part of the circuit board 4 in the longitudinal direction is fitted is formed.

Furthermore, the end part of the ferrite core 11 in the axial center direction on the opposite side to the side of the core body tip member 2 is fitted into the fitting recess 31 of the connecting member 3 and the protrusion 4*a* of the circuit board 4 is fitted into the fitting recess 34 of the connecting member 3. In addition, the board protection pipe 6 is fitted to the fitting part 33 of the connecting member 3. Thereby, the coil unit 1 becomes in a state of being joined to the board protection pipe 6 with the intermediary of the connecting member 3. When the coil unit 1 is joined to the board protection pipe 6 with the intermediary of the connecting member 3, the outer circumference of the board protection pipe 6 matches the outer circumference of the connecting member 3.

At this time, the extension lines 12*a* and 12*b* of the coil 12 are caused to pass through the concave groove 32 of the connecting member 3 and are extended onto the circuit board 4. Furthermore, the extension lines 12*a* and 12*b* of the coil 12 are soldered to conductor pads 41*a* and 41*b* connected to both ends of a capacitor 42 provided on the circuit board 4. This forms a parallel resonant circuit of the coil 12 and the capacitor 42. The electronic pen 10 of the present embodiment is configured to be capable of carrying out position indication to a position detecting device by transmitting and receiving a signal with a position detecting sensor of the position detecting device through this parallel resonant circuit.

Although the state in which one capacitor 42 is provided on the circuit board 4 is depicted in the diagram, the capacitor 42 is formed of plural capacitors including also capacitors for capacitance adjustment in practice. The capacitor 42 forms part of the constituent components for implementing the functions of the electronic pen.

The writing pressure detector 5 is provided on the opposite side to the side of the connecting member 3 in the longitudinal direction of the circuit board 4 (axial center direction). The writing pressure detector 5 is obtained by disposing a pressure sensing element in a package member composed of a resin for example and is a unit in which the pressure sensing part 53 including this pressure sensing element, the connection terminal part 51, and the fitting part 52 are monolithically formed by the resin as described above.

As depicted in FIG. 2, the connection terminal part 51 of the writing pressure detector 5 includes upper and lower two plate parts joined to the fitting part 52. These plate parts sandwich the circuit board 4. In this case, the interval between the upper and lower two plate parts is slightly smaller than the thickness of the circuit board 4, which allows the plate parts to clamp the circuit board 4. Furthermore, on one of these two plate parts, the upper plate part in the present embodiment, terminals 51*a* and 51*b* to which lead lines from a terminal member of the pressure sensing part 53 to be described later are connected are provided as depicted in FIG. 1 and FIG. 2. These terminals 51*a* and 51*b* are provided into a U-shape in such a manner as to extend from the upper surface of the upper plate part of the connection terminal part 51 and pass through the side surface to reach the lower surface. Due to this, when the circuit board 4 is clamped by (connected to) the connection terminal part 51, the terminals 51*a* and 51*b* of the connection terminal part 51 and terminals 41*c* and 41*d* of the circuit board 4 are automatically connected. In the circuit board 4, the terminals 41*c* and 41*d* are connected to one end and the other end of the capacitor 42 (see FIG. 1) and are further connected in parallel to the coil 12 and the capacitor 42 in the above-described parallel resonant circuit to form part of the resonant circuit.

The fitting part 52 is a part fitted to the board protection pipe 6. The fitting part 52 is formed into a substantially circular cylindrical shape for example. A concave part to which a protrusion 4*b* of the circuit board 4 is fitted is made inside the fitting part 52 although not depicted in the diagram. The outer diameter of the fitting part 52 is selected to be slightly larger than the inner diameter of the board protection pipe 6, which allows the fitting part 52 to be strongly fitted to the board protection pipe 6. Furthermore, when the board protection pipe 6 is fitted to the fitting part 52, the outer circumference of the board protection pipe 6 matches the outer circumference of the pressure sensing part 53. In order to facilitate the insertion into the board protection pipe 6, the fitting part 52 is formed into a shape having an inclined part whose diameter gradually becomes small compared with the diameter of the inner circumference of the board protection pipe 6 in the direction toward the end part on the side of the circuit board 4.

The pressure sensing part 53 is formed by mounting a component for pressure sensing in a package formed into a circular column shape by a resin or the like. The outer circumference and shape of the package part substantially match the outer circumference and shape of the board protection pipe 6.

Figure 3:
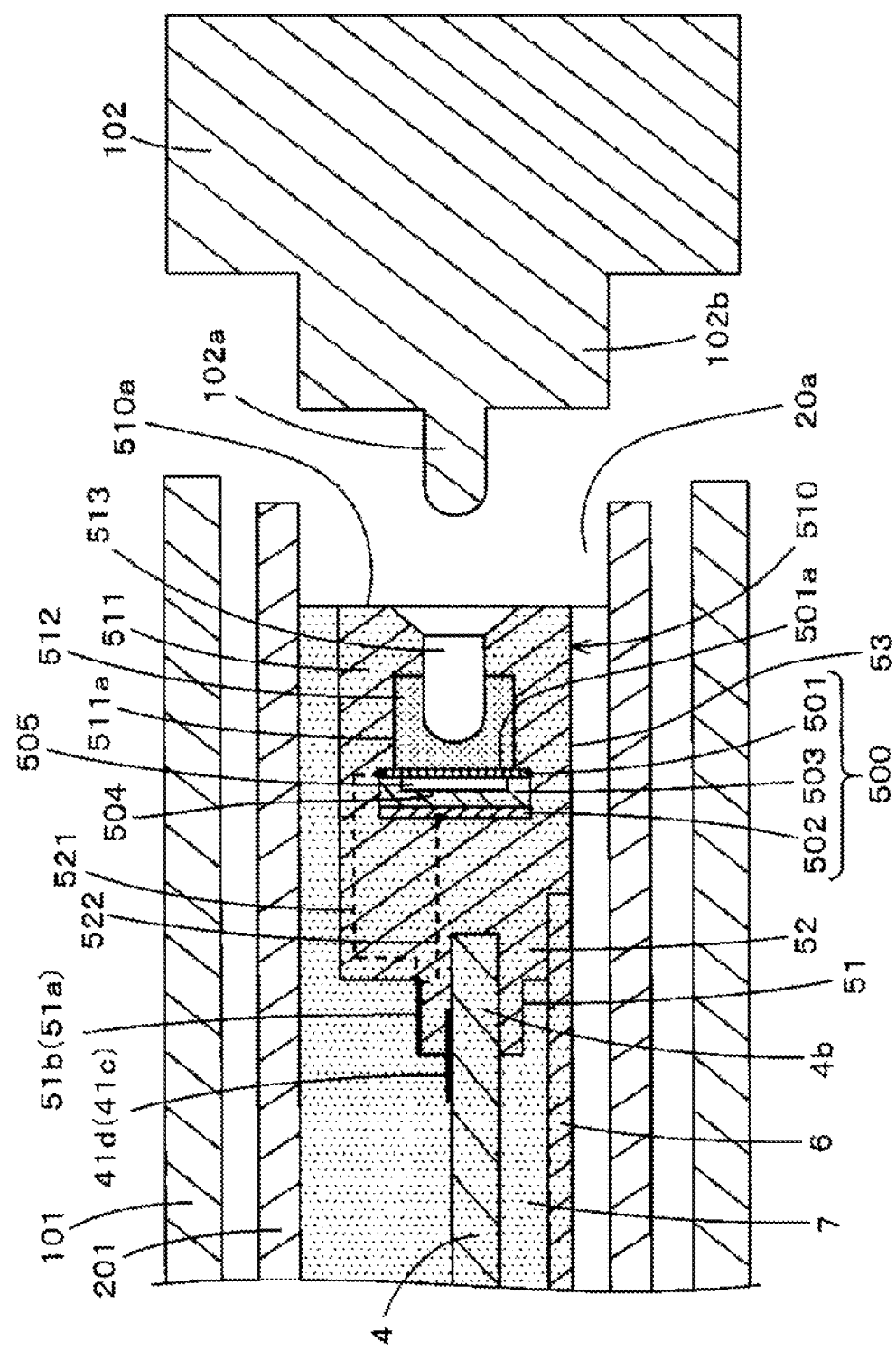
FIG. 3 is a diagram for explaining a configuration example of part of the electronic pen main unit that configures the electronic pen according to the first embodiment of the present disclosure.

FIG. 3 is a diagram for explaining the configuration of the writing pressure detector 5 in this example with focus on the pressure sensing part 53. In this example, in the pressure sensing part 53, the component for pressure sensing is formed of a semiconductor device referred to as a so-called micro electro mechanical system (MEMS). In the present embodiment, a capacitance-variable device for pressure sensing using this MEMS is referred to as a capacitive pressure sensing semiconductor device (hereinafter, referred to as pressure sensing device).

For example, the pressure sensing device of this example is obtained by sealing a pressure sensing chip 500 formed as a semiconductor device fabricated by a MEMS technique in a package 510 having e.g. a circular column shape.

The pressure sensing chip 500 detects the applied pressure as change in the capacitance. The pressure sensing chip 500 of this example is formed into a rectangular parallelepiped shape with vertical length×horizontal length×height=L×L×H and L=1.5 mm and H=0.5 mm are set for example.

The pressure sensing chip 500 of this example includes a first electrode 501, a second electrode 502, and an insulating layer (dielectric layer) 503 between the first electrode 501 and the second electrode 502. The first electrode 501 and the second electrode 502 are formed of a conductor composed of single crystal silicon (Si) in this example. The insulating layer 503 is formed of an oxide film ($SiO_2$) in this example.

Furthermore, on the side of the surface opposed to the first electrode 501 in the insulating layer 503, a circular concave part 504 centered at the central position of this surface is formed in this example. Due to the concave part 504, a space 505 is formed between the insulating layer 503 and the first electrode 501. In this example, the bottom surface of the concave part 504 is made as a flat surface and a radius R thereof is set to R=1 mm for example. Furthermore, the depth of the concave part 504 is set to approximately several tens of microns to hundred microns in this example.

Due to the existence of the space 505, it becomes possible for the first electrode 501 to be displaced to bend in the direction toward the space 505 when being pressed from the side of a surface 501a on the opposite side to the surface opposed to the second electrode 502. The thickness of the single crystal silicon as an example of the first electrode 501 is set to a thickness that enables bending by the applied pressure and is set thinner than the second electrode 502.

In the pressure sensing chip 500 having the above configuration, a capacitor 53C is formed between the first electrode 501 and the second electrode 502. Furthermore, when a pressure is applied to the first electrode 501 from the side of the surface 501a of the first electrode 501 on the opposite side to the surface opposed to the second electrode 502, the first electrode 501 bends and the distance between the first electrode 501 and the second electrode 502 becomes shorter, so that the value of the capacitance of the capacitor 53C changes to become larger. The amount of bending of the first electrode 501 changes according to the magnitude of the applied pressure. Therefore, the capacitor 53C serves as a capacitance-variable capacitor according to the magnitude of the pressure applied to the pressure sensing chip 500.

In the present embodiment, the pressure sensing chip 500 having the above configuration is housed in the package 510 in the state in which the surface 501a of the first electrode 501, which receives the pressure, is parallel to an upper surface 510a of the package 510 and is opposed to the upper surface 510a in FIG. 3.

In this example, the package 510 includes a package member 511 composed of an electrically-insulating material such as a ceramic material or a resin material and an elastic member 512 provided on the side of the surface 501a, which receives the pressure to the pressure sensing chip 500, in the package member 511.

Furthermore, in this example, a concave part 511a covering the area of the part that receives the pressure to the pressure sensing chip 500 is made at the upper part of the package member 511 on the side of the surface 501a of the first electrode 501, which receives the pressure to the pressure sensing chip 500. The concave part 511a is filled with the elastic member 512 composed of silicone rubber for example.

Moreover, a communicating hole 513 that communicates with part of the elastic member 512 from the upper surface 510a is formed in the package 510. Furthermore, the configuration is so made that a protrusion 102a provided in the casing lid 102 of the external casing 101 is inserted in the communicating hole 513. That is, in the present embodiment, in the state in which the electronic pen main unit 20 is housed in the external casing 101 and the external casing 101 is closed by the casing lid 102, the state in which the movement of the electronic pen main unit 20 in the axial center direction is restricted by the casing lid 102 is obtained, and the protrusion 102a of the casing lid 102 is in the state of being joined with the intermediary of the elastic member 512 in the pressure sensing part 53 of the writing pressure detector 5 of the electronic pen main unit 20. Due to this, it is possible for the whole of the electronic pen main unit 20 to be displaced toward the casing lid 102 against the elastic force of the elastic member 512 when a writing pressure is applied to the core body tip member 2, which protrudes from the electronic pen main unit casing 201 of the electronic pen main unit 20 and protrudes also from the external casing 101.

In the present embodiment, in order to allow the whole of the electronic pen main unit 20 to be displaced toward the casing lid 102 against the elastic force of the elastic member 512, the casing lid 102 is so configured that a gap δ is made between the casing lid 102 and the upper surface 510a of the package 510 of the pressure sensing part 53 corresponding to the maximum amount of displacement according to the applied writing pressure as depicted in FIG. 1 although the casing lid 102 abuts against the external casing 101.

Furthermore, in the present embodiment, as depicted in FIG. 1 and FIG. 3, when the hollow part of the electronic pen main unit casing 201 is filled with a resin, the upper surface 510a of the package 510 of the pressure sensing part 53 is set to the state of being exposed to the external. In addition, the upper surface 510a is set inside relative to the end surface of the electronic pen main unit casing 201 on the side of the casing lid 102. For this reason, a concave part 20a is formed on the side of the casing lid 102 in the electronic pen main unit 20.

Because the upper surface 510a of the package 510 of the pressure sensing part 53 is set to the state of being exposed to the external, the part of the package member 511 in the communicating hole 513 and the elastic member 512 also become the state of being exposed to the external. However, in this example, the whole of the package 510 of the pressure sensing part 53 is made waterproof. Thus, water or the like does not enter the inside from these exposed parts.

In the present embodiment, as depicted in FIG. 1, in the casing lid 102, a small-diameter part 102b formed to be fitted to the concave part 20a and be opposed to the upper surface 510a of the package 510 of the pressure sensing part 53 with separation from the upper surface 510a by the gap δ.

In this example, the diameter of the communicating hole 513 of the pressure sensing part 53 of the writing pressure detector 5 is set slightly smaller than the diameter of the protrusion 102a provided in the casing lid 102 of the external casing 101. Therefore, the protrusion 102a provided in the casing lid 102 of the external casing 101 is squeezed to the inside of the elastic member 512 at the end part of the communicating hole 513. Thus, the protrusion 102a provided in the casing lid 102 of the external casing 101 is positioned into the state of applying a pressure in the axial center direction to the side of the surface that receives the pressure of the pressure sensing chip 500 through only being inserted into the communicating hole 513 of the pressure sensing part 53 of the writing pressure detector 5.

In this case, because the diameter of the communicating hole 513 is slightly smaller than the diameter of the protrusion 102a provided in the casing lid 102 of the external casing 101, the protrusion 102a provided in the casing lid 102 of the external casing 101 becomes the state of being elastically held by the elastic member 512. That is, when being inserted in the communicating hole 513 of the pressure sensing part 53, the protrusion 102a provided in the casing lid 102 of the external casing 101 is held by the pressure sensing part 53. However, the state of being held by the pressure sensing part 53 can be easily released by pulling out the protrusion 102a provided in the casing lid 102 of the external casing 101 by a predetermined force.

Furthermore, as depicted in FIG. 3, from the package member 511 of the writing pressure detector 5, a first lead terminal 521 connected to the first electrode 501 of the pressure sensing chip 500 is led out and a second lead terminal 522 connected to the second electrode 502 of the pressure sensing chip 500 is led out. The first lead terminal 521 is electrically connected to the terminal 51a of the connection terminal part 51. Furthermore, the second lead terminal 522 is electrically connected to the terminal 51b of the connection terminal part 51.

The board protection pipe 6 is formed by using a metal composed of steel special use stainless (SUS), a carbon material, a synthetic resin, or the like for example and is a hard tubular member that is difficult to break and bend. Both ends of the board protection pipe 6 are openings. These openings at both ends of the board protection pipe 6 are openings in the direction intersecting the axial center direction. Furthermore, the opening part of the board protection pipe 6 on the side of the connecting member 3 serves as a fitting part to the connecting member 3. In addition, the opening part of the board protection pipe 6 on the side of the writing pressure detector 5 serves as a fitting part to the fitting part 52 of the writing pressure detector 5.

Moreover, the board protection pipe 6 has a side surface opening 61 in the direction along the axial center direction from one end to the other end in the axial center direction. The opening 61 is made for soldering of the extension lines 12a and 12b of the coil 12 to the conductor pads 41a and 41b of the circuit board 4, and so forth. In addition, the opening 61 enables laser cutting work for cutting the connection of a capacitor that is not used as the resonant circuit in order to adjust the capacitance of the capacitor 42.

Furthermore, the connection terminal part 51 of the writing pressure detector 5 is caused to clamp the end part of the circuit board 4 (side on which the terminals 41c and 41d are provided) and the protrusion 4b of the circuit board 4 is fitted to the concave part inside the fitting part 52. In addition, the end part of the board protection pipe 6 on the opposite side to the connecting member 3 is fitted to the fitting part 52 of the writing pressure detector 5.

In this manner, the coil unit 1, the connecting member 3, the circuit board 4, the board protection pipe 6, and the writing pressure detector 5 are lined up in the axial center direction and are joined, so that an integrated module component can be configured. In the present embodiment, this module component is housed in the hollow part of the electronic pen main unit casing 201. At this time, as depicted in FIG. 1, part of the ferrite core 11 of the coil unit 1 and the core body tip member 2 protrude to the external from the opening 201a of the electronic pen main unit casing 201 on the pen tip side. Furthermore, as described above, the upper surface 510a of the package 510 of the pressure sensing part 53 of the writing pressure detector 5 is located inside relative to the end surface of the electronic pen main unit casing 201 on the side of the casing lid 102 as depicted in FIG. 1 and FIG. 3, which provides the state in which the concave part 20a is formed.

As depicted in FIG. 2, in the side surface of the electronic pen main unit casing 201, a resin loading hole 201b for pouring a molten resin into the hollow part of the electronic pen main unit casing 201 and filling this hollow part with the resin is formed. Prior to pouring the molten resin into the electronic pen main unit casing 201, the electronic pen main unit casing 201 of the electronic pen main unit 20 on the side of the casing lid 102 is closed by a jig for resin filling having the same shape as the casing lid 102. The height, in the axial center direction, of a small-diameter part of this jig for resin filling corresponding to the small-diameter part 102b of the casing lid 102 is set higher than the height of the small-diameter part 102b of the casing lid 102 in the axial center direction by the above-described gap δ. Furthermore, the gap between the outer circumference of the opening 201a of the electronic pen main unit casing 201 and the ferrite core 11 forming the core body is also closed by putty that can be easily removed later or the like for example.

Then, in this state, the molten resin is poured from the resin loading hole 201b in the side surface of the electronic pen main unit casing 201 into the hollow part of the electronic pen main unit casing 201 and this hollow part is filled with the resin. In FIG. 1 and FIG. 3, the part depicted by halftone dots represents a resin 7 with which the hollow part is filled. Then, after the resin 7 is solidified, the jig having the same shape as the casing lid 102 is removed and the putty provided on the side of the opening 201a is removed. Then, the resin loading hole 201b is closed by a lid body 201c, so that the electronic pen main unit 20 is completed.

Then, the electronic pen main unit 20 is inserted in the hollow part of the external casing 101 and the part of the ferrite core 11 around which the coil 12 is not wound and the core body tip member 2 are protruded from the opening 101a of the external casing 101. At this time, as described above, the concave part 20a is formed at the end part of the electronic pen main unit 20 on the opposite side to the side of the core body tip member 2 in the hollow part of the external casing 101. In addition, the upper end surface of the package 510 of the pressure sensing part 53 of the writing pressure detector 5 is exposed, which provides the state in which the opening of the communicating hole 513 of the pressure sensing part 53 is exposed.

Then, while the small-diameter part 102b of the casing lid 102 is inserted in the concave part 20a, the protrusion 102a is inserted in the communicating hole 513 of the pressure sensing part 53 of the writing pressure detector 5 and is squeezed to the elastic member 512. Then, the casing lid 102 is joined and fixed to the external casing 101. Through the above, the electronic pen 10 is completed.

[Outline of Circuit Configuration of Electronic Pen 10 and Position Detecting Device]

Figure 4:
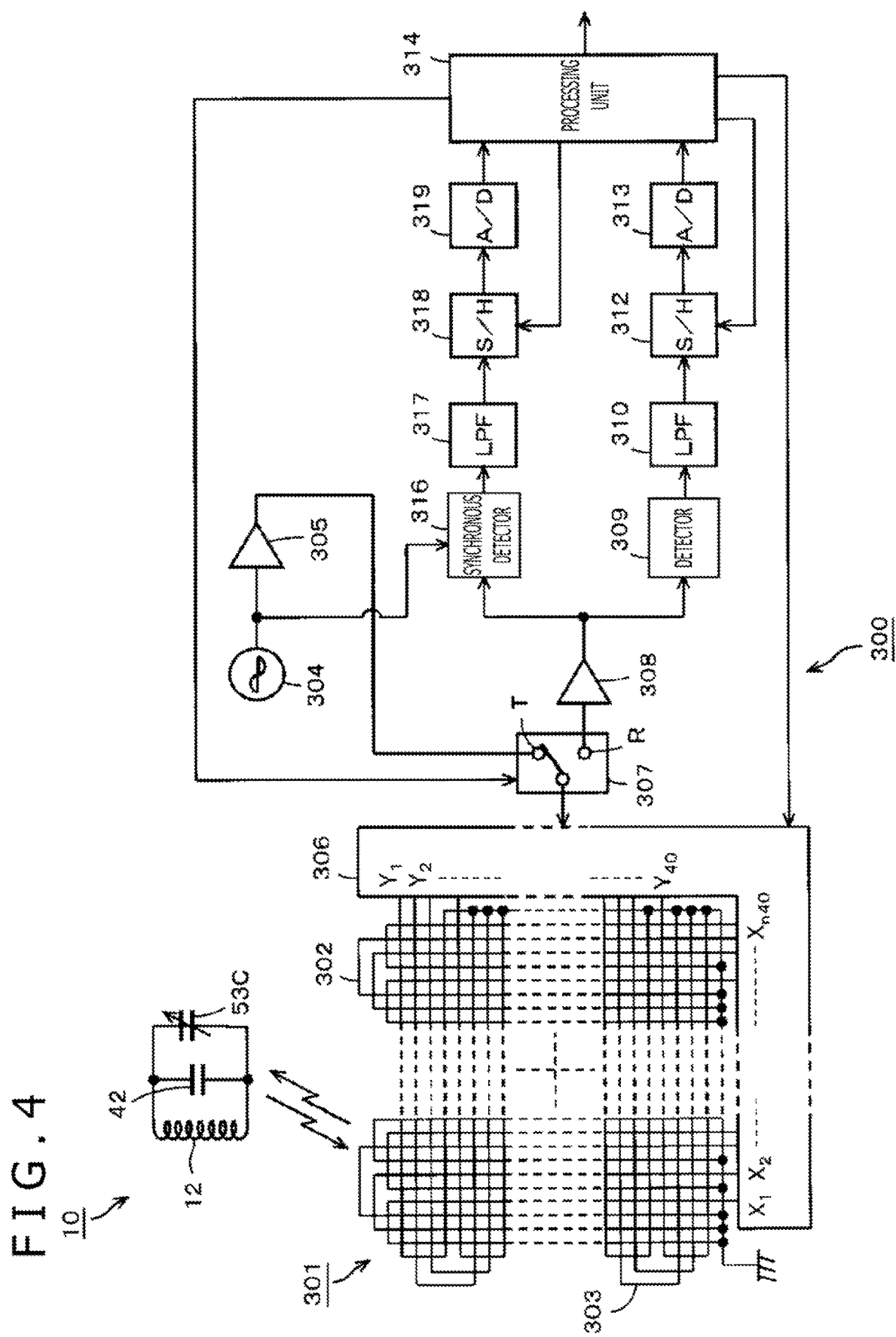
FIG. 4 is a diagram depicting an electronic circuit configuration example of the electronic pen according to the first embodiment of the present disclosure and a circuit configuration example of a position detecting device.

Next, description will be made with reference to FIG. 4 about a circuit configuration example of an embodiment of a position detecting device 300 of the electromagnetic induction system that is used with the electronic pen 10 of the present embodiment to detect a position indicated by the electronic pen and detects (senses) the writing pressure applied to the core body tip member 2 of the electronic pen 10. In FIG. 4, the circuit configuration of the electronic pen 10 is also depicted and a block diagram depicting the circuit configuration example of the position detecting device 300 is depicted.

In the electronic pen 10, as depicted in FIG. 4, a parallel resonant circuit of the coil 12, the capacitor 42 on the circuit board 4, and the capacitance-variable capacitor 53C formed of the pressure sensing chip 500 as a component for pressure sensing in the pressure sensing part 53 of the writing pressure detector 5 is formed by lining up the coil unit 1, the connecting member 3, the circuit board 4, the board protection pipe 6, and the writing pressure detector 5 in the axial center direction to join them to configure the integrated module component as described above.

When a writing pressure is applied to the core body tip member 2, the whole of the electronic pen main unit 20 is displaced toward the casing lid 102 through the elastic member 512. Due to this, the pressure sensing chip 500 of the pressure sensing part 53 of the writing pressure detector 5 receives the pressure according to the applied writing pressure, which makes the capacitance variable.

In the position detecting device 300, a coordinate detecting sensor 301 of the electromagnetic induction system is formed by providing an X-axis direction loop coil group 302 and a Y-axis direction loop coil group 303 in a stacked manner. The respective loop coil groups 302 and 303 are each composed of 40 rectangular loop coils for example. The respective loop coils configuring the respective loop coil groups 302 and 303 are disposed to be lined up at equal intervals and sequentially overlap with each other.

Furthermore, in the position detecting device 300, a selection circuit 306 to which the X-axis direction loop coil group 302 and the Y-axis direction loop coil group 303 are connected is provided. The selection circuit 306 sequentially selects one loop coil in the two loop coil groups 302 and 303.

Moreover, the position detecting device 300 is provided with an oscillator 304, a current driver 305, a switching connecting circuit 307, a receiving amplifier 308, a detector 309, a low-pass filter 310, a sample/hold circuit 312, an analog to digital (A/D) conversion circuit 313, a synchronous detector 316, a low-pass filter 317, a sample/hold circuit 318, an A/D conversion circuit 319, and a processing unit 314 (e.g., microprocessor).

The oscillator 304 generates an alternating current (AC) signal with a frequency f0 and supplies the AC signal to the current driver 305 and the synchronous detector 316. The current driver 305 converts the AC signal supplied from the oscillator 304 to a current and sends out the current to the switching connecting circuit 307. Based on control from the processing circuit 314 to be described later, the switching connecting circuit 307 switches the connection target (transmitting-side terminal T, receiving-side terminal R) to which the loop coil selected by the selection circuit 306 is connected. In these connection targets, the transmitting-side terminal T and the receiving-side terminal R are connected to the current driver 305 and the receiving amplifier 308, respectively.

An induced voltage generated in the loop coil selected by the selection circuit 306 is sent to the receiving amplifier 308 via the selection circuit 306 and the switching connecting circuit 307. The receiving amplifier 308 amplifies the induced voltage supplied from the loop coil and sends out the amplified voltage to the detector 309 and the synchronous detector 316.

The detector 309 detects the induced voltage generated in the loop coil, i.e. the received signal, and sends out the received signal to the low-pass filter 310. The low-pass filter 310 has a cutoff frequency sufficiently lower than the above-described frequency f0 and converts the output signal of the detector 309 to a direct current (DC) signal to send out the DC signal to the sample/hold circuit 312. The sample/hold circuit 312 holds a voltage value at predetermined timing of the output signal of the low-pass filter 310, specifically at predetermined timing in the reception period, and sends out the voltage value to the A/D conversion circuit 313. The A/D conversion circuit 313 converts the analog output of the sample/hold circuit 312 to a digital signal and outputs the digital signal to the processing circuit 314.

Meanwhile, the synchronous detector 316 carries out synchronous detection of the output signal of the receiving amplifier 308 with the AC signal from the oscillator 304 and sends out a signal at a level according to the phase difference between them to the low-pass filter 317. The low-pass filter 317 has a cutoff frequency sufficiently lower than the frequency f0 and converts the output signal of the synchronous detector 316 to a DC signal to send out the DC signal to the sample/hold circuit 318. The sample/hold circuit 318 holds a voltage value at predetermined timing of the output signal of the low-pass filter 317 and sends out the voltage value to the A/D conversion circuit 319. The A/D conversion circuit 319 converts the analog output of the sample/hold circuit 318 to a digital signal and outputs the digital signal to the processing circuit 314.

The processing circuit 314 controls the respective electronic components of the position detecting device 300. Specifically, the processing circuit 314 controls selection of the loop coil in the selection circuit 306, switching by the switching connecting circuit 307, and the timing of the sample/hold circuits 312 and 318. The processing control circuit 314 causes radio waves to be transmitted from the X-axis direction loop coil group 302 and the Y-axis direction loop coil group 303 with a certain transmission continuation time based on input signals from the A/D conversion circuits 313 and 319.

In each loop coil of the X-axis direction loop coil group 302 and the Y-axis direction loop coil group 303, an induced voltage is generated by radio waves transmitted from the electronic pen 10. The processing circuit 314 calculates the coordinate value of the position indicated by the electronic pen 10 regarding the X-axis direction and the Y-axis direction based on the level of the voltage value of this induced voltage generated in each loop coil. Furthermore, the processing circuit 314 detects the writing pressure based on the phase difference between transmitted radio waves and received radio waves. In this manner, an input device can be configured by the electronic pen 10 of the electromagnetic induction system according to the present embodiment and the position detecting device 300 of the electromagnetic induction system depicted in FIG. 4.

Effects of First Embodiment

In the electronic pen 10 of the present embodiment, all except part of the ferrite core 11 and the core body tip member 2 in the components that configure the electronic pen 10 are housed in the hollow part of the electronic pen main unit casing 201 and the hollow part is filled with a resin. Thereby, dust resistance and water resistance are established. That is, the electronic components and electrical connection parts that configure the electronic pen 10 are covered by the resin and molded, so that the dust resistance and water resistance are surely established.

Furthermore, according to the electronic pen 10 of the present embodiment, the writing pressure detector 5 is provided at the end part of the electronic pen main unit 20 on the opposite side to the core body tip member 2 of the electronic pen main unit casing (internal casing) and is engaged with the casing lid 102 with the intermediary of the elastic member 512. Moreover, the writing pressure detector 5 is configured to be capable of detecting, by the pressure sensing chip 500, the pressure based on the displacement of the whole of the electronic pen main unit 20 toward the casing lid 102 through the elastic member 512 and detecting the pressure as change in the capacitance, which is an electrical amount, when a writing pressure is applied to the core body tip member 2.

That is, although the writing pressure detector 5 is housed in the electronic pen main unit casing (internal casing) of the electronic pen main unit 20 and is molded by the resin, the writing pressure applied to the core body tip member 2 can be detected.

In the electronic pen 10 of the present embodiment, a packing made of rubber and an O-ring are not used differently from Patent Document 1 and Patent Document 2 described at the beginning. Thus, the deterioration of these components for dust resistance and water resistance does not need to be considered and the electronic pen 10 withstands even change over time. In addition, these components for dust resistance and water resistance do not act as a load on the displaced part in writing pressure detection and the writing pressure can be accurately detected.

Furthermore, in the present embodiment, the pressure sensing chip 500 formed of a semiconductor device is used and the package 510 of the pressure sensing part 53 is made waterproof. Therefore, even when water enters between the communicating hole 513 of the pressure sensing part 53 and the protrusion 102*a* of the casing lid 102 fitted to the communicating hole 513, the function of the pressure sensing chip 500 inside the package 510 is not impaired.

Modification Example of First Embodiment

In the above-described first embodiment, in order to join the coil unit 1, the circuit board 4, and the writing pressure detector 5, the connecting member 3 and the board protection pipe 6 are used and contrivance is made regarding the configuration of the casing of the writing pressure detector 5. However, as long as these coil unit 1, circuit board 4, and writing pressure detector 5 are housed in the hollow part of the electronic pen main unit casing 201 in the state of being electrically connected, filling with a resin is possible and therefore the connecting member 3 and the board protection pipe 6 do not need to be used and the above-described special configuration does not need to be employed as the configuration of the casing of the writing pressure detector 5.

Furthermore, in the above-described first embodiment, the part of the ferrite core 11 around which the coil 12 is not wound is set long and this part around which the coil 12 is not wound is protruded to the external from the inside of the hollow parts of the electronic pen main unit casing 201 and the external casing 101. However, the electronic pen 10 is not limited to such a configuration. For example, the length of the core body tip member 2 may be extended and the joint part between the ferrite core 11 and the core body tip member 2 may be set inside the hollow part of the electronic pen main unit casing 201. However, if the part of the ferrite core 11 around which the coil 12 is not wound is protruded to the external from the inside of the hollow parts of the electronic pen main unit casing 201 and the external casing 101 as in the first embodiment, there is an advantage that electromagnetic induction coupling with the position detecting sensor becomes stronger.

Second Embodiment

The electronic pen 10 of the above-described first embodiment has a configuration in which the electronic pen main unit 20 is included in the hollow part of the external casing 101, and the electronic pen main unit 20 can be used as a refill for replacement for a ballpoint pen or the like of a writing material as a so-called cartridge. A second embodiment is an example of an electronic pen using a feature that use as a cartridge is possible regarding the electronic pen main unit 20.

Furthermore, the electronic pen main unit 20 can not only be used as a cartridge but also be treated similarly to a replaceable refill for a knock-type ballpoint pen. That is, it is possible for the electronic pen main unit 20 to be joined to a joint part to a replaceable refill in a knock mechanism. However, in this case, at the joint part of the knock mechanism to which the electronic pen main unit 20 is joined, the small-diameter part 102*b* and the protrusion 102*a* of the casing lid 102 in the above-described first embodiment are provided.

The second embodiment is an example of an electronic pen using an electronic pen main unit having the same configuration as the electronic pen main unit 20 as one or plural replaceable refills of a so-called multicolor ballpoint pen in view of the above point.

Figure 5:
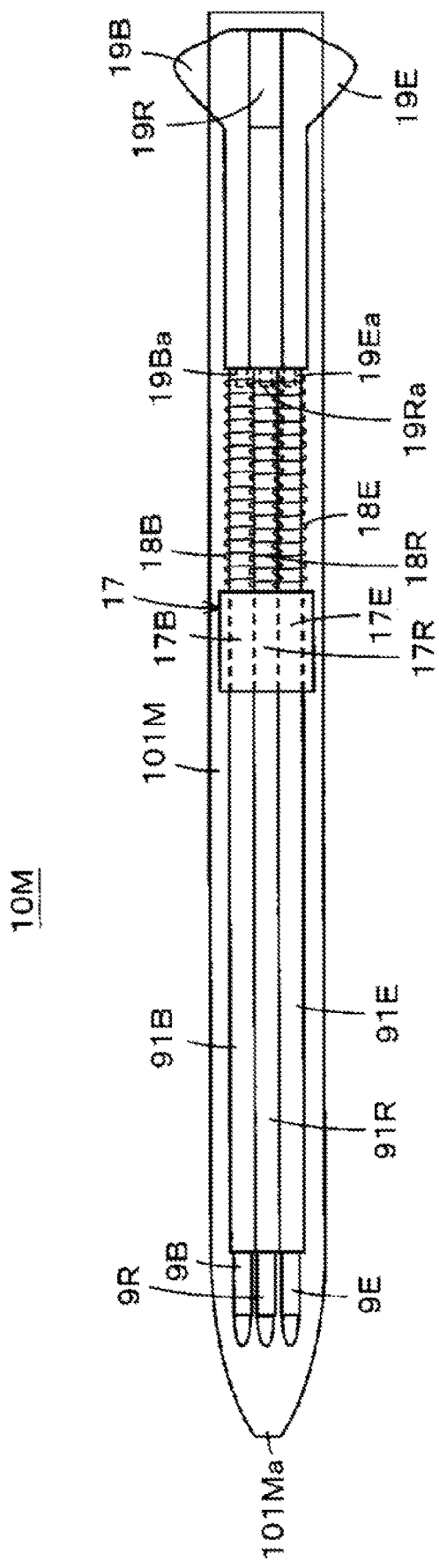
FIG. 5 is a diagram for explaining a configuration example of an electronic pen according to a second embodiment of the present disclosure.

FIG. 5 is a configuration diagram depicting the appearance of an electronic pen 10M of this example. This example of FIG. 5 is depicted in a state in which an external casing 101M of the electronic pen 10M is composed of a transparent synthetic resin and the inside thereof is visible in a see-through manner.

The external casing 101M of the electronic pen 10M has the same configuration as the casing and knock cam mechanism of a knock-type multicolor ballpoint pen. Furthermore, as one of replaceable refills, an electronic pen main unit having the same configuration as the above-described electronic pen main unit 20 is used. If the dimensions, such as length and diameter, of the electronic pen main unit and the configuration and dimensions of the pen tip side are configured similarly to a refill of a commercially-available ballpoint pen, it is also possible to use the casing and knock cam mechanism of the commercially-available knock-type ballpoint pen. In this example, three cartridges 9B, 9R, and 9E are housed in the external casing 101M.

Furthermore, in this example, the cartridges 9B and 9R in the three cartridges 9B, 9R, and 9E are refills of a ballpoint pen. The cartridge 9B is a ballpoint pen refill of black ink and the cartridge 9R is a ballpoint pen refill of red ink. In addition, the cartridge 9E has the configuration of a cartridge for an electronic pen. The cartridge 9E for an electronic pen is configured similarly to the electronic pen main unit 20 in the above-described first embodiment in terms of the outer shape except for that the cartridge 9E is configured with the same dimensions as a refill of a multicolor ballpoint pen.

An opening 101Ma is formed at one end side of the external casing 101M in the axial center direction. When any of the cartridges 9B, 9R, and 9E is moved by sliding in the axial center direction by a knock mechanism, the tip part of the core body serving as the pen tip thereof is protruded to the external through the opening 101Ma. In the state in which the cartridges 9B, 9R, and 9E have not been moved by sliding in the axial center direction by the knock mechanism, the whole including the tip ends of the pen tips of them is housed in the hollow part of the external casing 101M as depicted in FIG. 5 and the cartridges 9B, 9R, and 9E are in the protected state.

The knock mechanism of the electronic pen 10M includes knock bars 19B, 19R, and 19E having fitting parts 19Ba, 19Ra, and 19Ea to which the cartridges 9B, 9R, and 9E, respectively, are fitted, a spring receiving member 17, and coil springs 18B, 18R, and 18E disposed between the fitting parts 19Ba, 19Ra, and 19Ea of the cartridges 9B, 9R, and 9E and the spring receiving member 17. At the fitting part 19Ea for the cartridge 9E for an electronic pen, the small-diameter part 102b and the protrusion 102a of the casing lid 102 in the above-described first embodiment are provided as described above.

The spring receiving member 17 is fixed and attached at a predetermined position in the axial center direction in the hollow part of the external casing 101M. In the spring receiving member 17, through-holes 17B, 17R, and 17E in which cartridge casings 91B, 91R, and 91E of the cartridges 9B, 9R, and 9E are inserted are formed. The cartridges 9B, 9R, and 9E are attached to the knock mechanism of the electronic pen 10M by being inserted in the through-holes 17B, 17R, and 17E, respectively, of the spring receiving member 17 and the coil springs 18B, 18R, and 18E, respectively, and being fitted to the fitting parts 19Ba, 19Ra, and 19Ea of the knock bars 19B, 19R, and 19E.

At the parts where the knock bars 19B, 19R, and 19E are housed in the external casing 101M, through-slits (diagrammatic representation is omitted in FIG. 5) by which part of the knock bars 19B, 19R, and 19E is exposed to the external and each of the knock bars 19B, 19R, and 19E is enabled to move in the axial center direction.

In the electronic pen 10M, similarly to a known multicolor ballpoint pen, when any of the knock bars 19B, 19R, and 19E is slid toward the opening 101Ma and the tip of the core body of any of the cartridges 9B, 9R, and 9E fitted to the knock bar becomes the state of protruding from the opening 101Ma to the external, the knock bar becomes a locked state in which a locking part (diagrammatic representation is omitted) of the knock bar 19B, 19R, or 19E engages with an engagement part formed in the hollow part of the external casing 101M and is locked in the state.

Then, when another knock bar is slid toward the opening 101Ma in the locked state, the locking of the knock bar in the locked state is released and the knock bar returns to the original state depicted in FIG. 5 due to any of the coil springs 18B, 18R, and 18E. Furthermore, the knock bar moved by sliding later can become the locked state in the state in which the tip of the core body of any of the cartridges 9B, 9R, and 9E fitted to the knock bar protrudes from the opening 101Ma to the external.

By moving the knock bar by sliding similarly, the cartridge whose tip is protruded from the opening 101Ma can be changed. When slide movement of any of the knock bars 19B, 19R, and 19E is stopped in the middle of becoming the locked state, the locking of another knock bar in the locked state is released and the knock bar returns to the protected state depicted in FIG. 5 due to any of the coil springs 18B, 18R, and 18E.

According to the electronic pen 10M of the second embodiment, what has functions of a ballpoint pen as a writing material and an electronic pen can be obtained. Furthermore, also in the case in which the electronic pen 10M has a cartridge for an electronic pen as a refill, there is an advantage that water resistance performance is high and the electronic pen 10M can be used without impairment of functions as the electronic pen even when the electronic pen 10M is accidentally dropped in water for example.

Third Embodiment: Electronic Pen of Capacitive Coupling System

Figure 6:
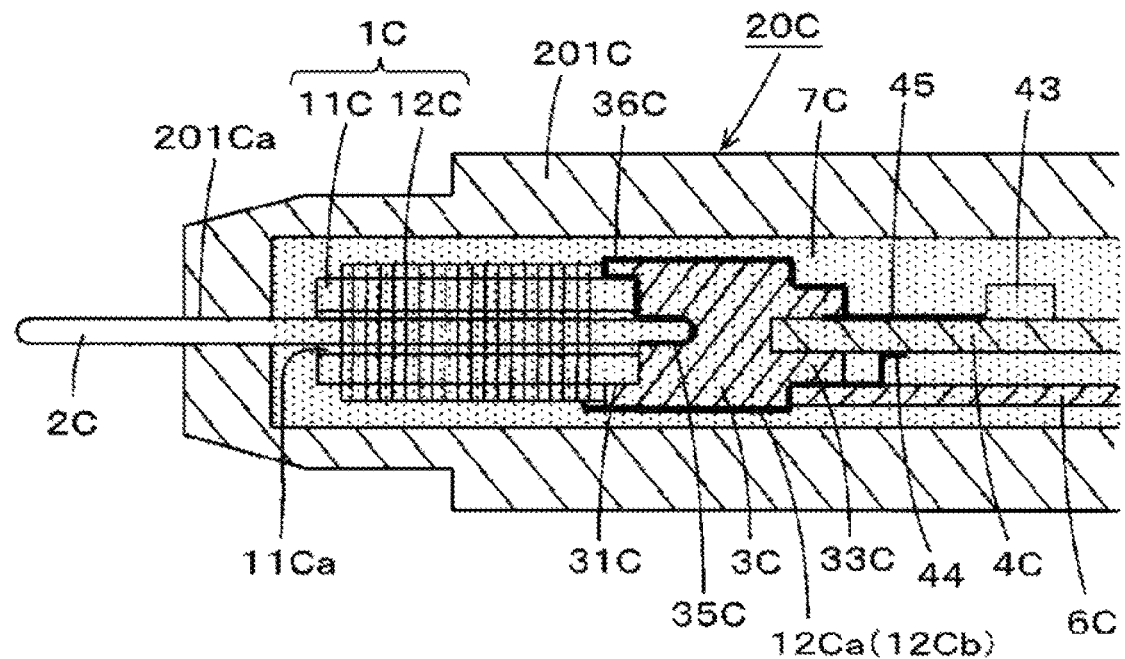
FIG. 6 is a diagram for explaining part of a configuration example of an electronic pen according to a third embodiment of the present disclosure.

The electronic pens of the above-described embodiments are electronic pens of the electromagnetic induction system. However, the present disclosure can be applied also to the case of configuring an electronic pen of a capacitive coupling system. FIG. 6 is a sectional view for explaining part of an example of an electronic pen main unit 20C in a third embodiment in which the present disclosure is applied to an electronic pen of the capacitive coupling system, and depicts a configuration example of the core body part side of the electronic pen main unit. In the electronic pen main unit 20C of this example of FIG. 6, for a constituent part similar to that in the electronic pen main unit 20 of the electronic pen 10 of the above-described first embodiment, a reference symbol obtained by adding a suffix C to the same number is used.

In the electronic pen main unit 20C in the electronic pen of the third embodiment, a signal transmitting circuit 43 is provided on a circuit board 4C and a rechargeable power supply circuit, about which diagrammatical representation is omitted in FIG. 6, is provided. Furthermore, the electronic pen main unit 20C includes an electrically-conductive core body 2C and supplies a signal from the signal transmitting circuit 43 to a position detecting device of the capacitive coupling system through the core body 2C.

For this reason, in the electronic pen main unit 20C in the electronic pen of the third embodiment, the configuration of parts of a coil unit 1C and a connecting member 3C and the connection part between the circuit board 4C held and protected by a board protection pipe 6C and the connecting member 3C is different from the electronic pen main unit 20 of the first embodiment. The configuration of the other parts, specifically the electrical connection and mechanical joint relationship between the circuit board 4C held and protected by the board protection pipe 6C and the writing pressure detector 5 and a configuration in which a hollow part in an electronic pen main unit casing 201C is filled with a resin 7C, is made similarly to the first embodiment.

As depicted in FIG. 6, in the third embodiment, the coil unit 1C is configured by winding a coil 12C around a ferrite core 11C in which a through-hole 11Ca is formed. Furthermore, similarly to the electronic pen main unit 20 of the first embodiment, an end part of the ferrite core 11C in the axial center direction is housed in a fitting recess 31C of the connecting member 3C and thereby the coil unit 1C is joined to the connecting member 3C.

Furthermore, the core body 2C has a configuration of an electrically-conductive rod-shaped body composed of a metal, a material obtained by mixing electrically-conductive metal powders in a resin, or the like. The core body 2C is fitted to a core body fitting part 35C made in the bottom surface of the fitting recess 31C of the connecting member 3C via the through-hole 11Ca of the ferrite core 11C.

In the third embodiment, a fitting part 33C to the circuit board 4C in the connecting member 3C is configured to clamp the circuit board 4C similarly to the connection terminal part 51 of the writing pressure detector 5 in the first embodiment. Furthermore, on the connecting member 3C, an electrically-conductive member 36C is formed to a plate part that clamps the circuit board 4C in the fitting part 33C so as to be electrically connected to an electrically-conductive pattern 45 connected to a signal output terminal of the signal transmitting circuit 43 disposed on the circuit board 4C. As depicted by a thick line in FIG. 6, the electrically-conductive member 36C is extended to the core body fitting part 35C made in the bottom surface of the fitting recess 31C of the connecting member 3C and is electrically connected to the core body 2C fitted to the core body fitting part 35C. That is, when being fitted to the core body fitting part 35C, the core body 2C is set to the state of being electrically connected to the signal output terminal of the signal transmitting circuit 43.

Furthermore, also in the third embodiment, the coil 12C is electrically connected to the circuit board 4C by extension lines 12Ca and 12Cb similarly to the case of the first embodiment.

Moreover, in the electronic pen main unit 20C in the third embodiment, the configuration is made as depicted in FIG. 6. Specifically, the whole of the ferrite core 11C is housed in the electronic pen main unit casing 201C. In addition, even when a gap exists between the core body 2C and the outer circumference of the through-hole 11Ca of the ferrite core 11C, the gap is filled with the resin 7C.

[Circuit Configuration of Electronic Pen Main Unit 20C]

Figure 7:
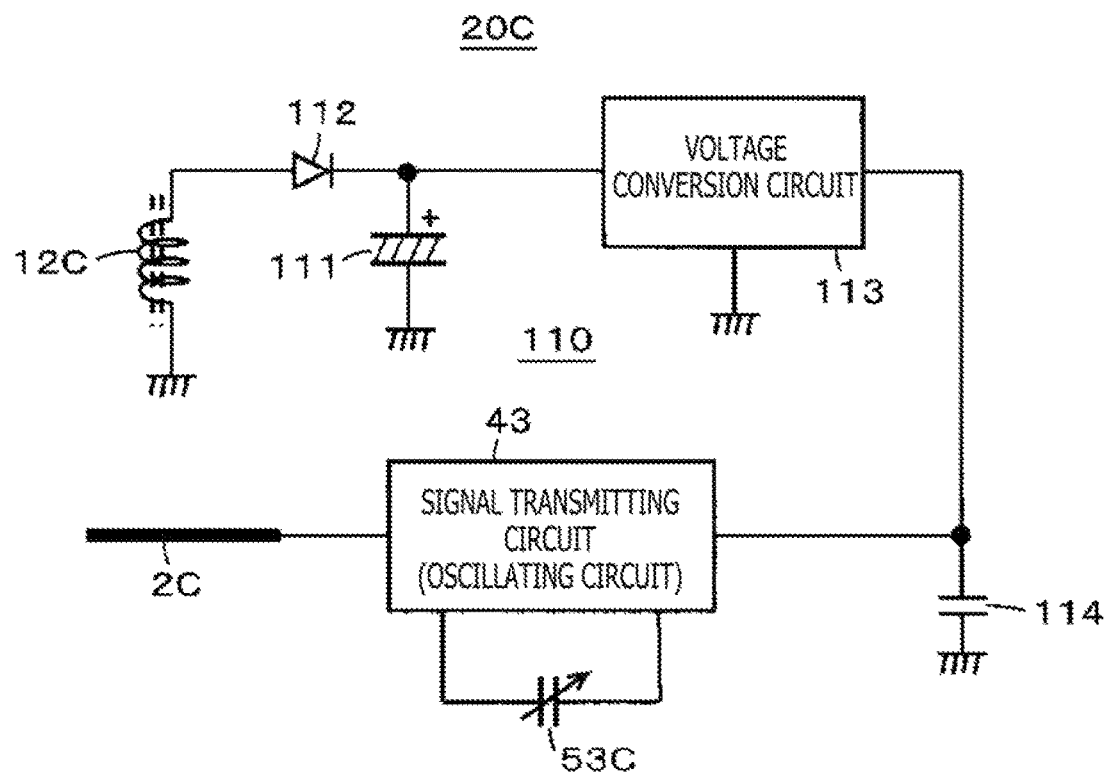
FIG. 7 is a diagram depicting an electronic circuit configuration example of the electronic pen according to the third embodiment of the present disclosure.

FIG. 7 is a diagram depicting one example of the electronic circuit of the electronic pen main unit 20C of the electronic pen of the third embodiment. The electronic pen main unit 20C of the electronic pen of the third embodiment includes the signal transmitting circuit 43. A signal for position detection is sent out from the signal transmitting circuit 43 from the core body 2C of the electronic pen main unit 20C of the third embodiment to a position detecting sensor of the position detecting device of the capacitive system corresponding to the electronic pen in which the electronic pen main unit 20C is housed in an external casing. In the position detecting sensor, the signal for position detection from this electronic pen is detected and thereby a position indicated by this electronic pen is detected.

In this case, the signal transmitting circuit 43 is formed of an oscillating circuit in this example and this oscillating circuit is formed of an inductance-capacitance (LC) oscillating circuit using resonance by a coil and a capacitor, about which diagrammatic representation is omitted, for example. Furthermore, both ends of the capacitance-variable capacitor 53C formed of the pressure sensing part 53 of the writing pressure detector 5 are electrically connected to the signal transmitting circuit 43 formed on the circuit board 4C in such a manner as to form part of the resonant circuit as depicted in FIG. 7. The oscillating circuit that configures the signal transmitting circuit 43 generates a signal whose frequency changes according to the capacitance of the capacitance-variable capacitor 53C formed of the pressure sensing part 53 of the writing pressure detector 5 and supplies the generated signal to the core body 2C.

Furthermore, as described above, in the electronic pen main unit 20C in the third embodiment, the coil 12C wound around the ferrite core 11C is used as part of a charging circuit that charges a power supply of the signal transmitting circuit 43. Specifically, in this example, the electronic circuit formed on the circuit board 4C includes, besides the signal transmitting circuit 43, a drive voltage generating circuit 110 (power supply circuit) that generates a drive voltage (power supply voltage) for driving the signal transmitting circuit 43 as depicted in FIG. 7. The drive voltage generating circuit 110 has a circuit configuration including an electric double-layer capacitor 111 as an example of a power storage element, a diode 112 for rectification, a voltage conversion circuit 113, and a capacitor 114.

When the electronic pen including the electronic pen main unit 20C of the third embodiment is mounted to a charger, which is not depicted in the diagram, an induced electromotive force is generated in the coil 12C due to an alternating magnetic field generated by the charger and the electric double-layer capacitor 111 is charged through the diode 112. The voltage conversion circuit 113 receives a voltage stored in the electric double-layer capacitor 111 and converts the voltage to a constant voltage to supply the constant voltage as the power supply of the signal transmitting circuit 43.

When the electronic pen of the third embodiment carries out normal operation of sending out a signal to the position detecting sensor of the position detecting device, the coil 12C is set to a fixed potential (in this example, ground potential (GND)) as depicted in FIG. 7 and the coil 12C acts as a shield electrode provided around the core body 2C. The fixed potential of the coil 12C when the electronic pen of the third embodiment carries out normal operation is not limited to the ground potential and may be a positive-side potential of the power supply (drive voltage) or may be an intermediate potential between the positive-side potential of the power supply (drive voltage) and the ground potential.

[Outline of Position Detecting Device of Capacitive Coupling System]

FIG. 8 is a block diagram for explaining a position detecting device 400 using a coordinate detecting sensor of the capacitive coupling system that receives a signal from the electronic pen 10C configured with use of the electronic pen main unit 20C depicted in FIG. 7 to detect a position on the sensor and detect the writing pressure.

As depicted in FIG. 8, the position detecting device 400 of this example includes a coordinate detecting sensor (hereinafter, abbreviated as sensor) 410 of the capacitive coupling system and a pen detecting circuit 420 connected to the sensor 410. In this example, the sensor 410 is a component formed by stacking a first conductor group 411, an insulating layer (diagrammatic representation is omitted), and a second conductor group 412 sequentially from the lower layer side although a sectional view is omitted. For example, the first conductor group 411 is a group obtained by disposing plural first conductors 411Y1, 411Y2, . . . , 411Ym (m is a positive integer) that extend along the horizontal direction (X-axis direction) in the Y-axis direction in parallel, with the plural first conductors 411Y1, 411Y2, . . . , 411Ym separated from each other by predetermined intervals. Furthermore, the second conductor group 412 is a group obtained by disposing plural second conductors 412X1, 412X2, . . . , 412Xn (n is a positive integer) that extend along the vertical direction (Y-axis direction) orthogonal to the first conductor group 411 in the X-axis direction in parallel, with the plural second conductors 412X1, 412X2, . . . , 412Xn separated from each other by predetermined intervals.

As above, the sensor 410 of the position detecting device 400 has a configuration to detect a position indicated by the electronic pen 10C by using the sensor pattern formed by making the first conductor group 411 intersect the second conductor group 412. In the following description, regarding the first conductors 411Y1, 411Y2, . . . , 411Ym, the conductor will be referred to as the first conductor 411Y when there is no need to discriminate the respective conductors. Similarly, regarding the second conductors 412X1, 412X2, . . . , 412Xn, the conductor will be referred to as the second conductor 412X when there is no need to discriminate the respective conductors.

The pen detecting circuit 420 includes a selection circuit 421 used as an input/output interface with the sensor 410, an amplifying circuit 422, a band-pass filter 423, a detection circuit 424, a sample/hold circuit 425, an AD conversion circuit 426, and a control circuit 427 (e.g., microprocessor).

The selection circuit 421 selects one conductor 411Y or 412X from the first conductor group 411 and the second conductor group 412 based on a control signal from the control circuit 427. The conductor selected by the selection circuit 421 is connected to the amplifying circuit 422 and a signal from the electronic pen 10C is detected by the selected conductor and is amplified by the amplifying circuit 422. The output of the amplifying circuit 422 is supplied to the band-pass filter 423 and only a component of the frequency of the signal transmitted from the electronic pen 10C is extracted.

An output signal of the band-pass filter 423 is subjected to detection by the detection circuit 424. An output signal of the detection circuit 424 is supplied to the sample/hold circuit 425 and is sampled and held at predetermined timing based on a sampling signal from the control circuit 427. Thereafter, the signal is converted to a digital value by the AD conversion circuit 426. The digital data from the AD conversion circuit 426 is read by the control circuit 427 and is processed.

The control circuit 427 operates to send out a control signal individually to the sample/hold circuit 425, the AD conversion circuit 426, and the selection circuit 421 based on a program stored in a read-only memory (ROM) inside the control circuit 427. Furthermore, the control circuit 427 calculates position coordinates on the sensor 410 indicated by the electronic pen 10C from the digital data from the AD conversion circuit 426. Moreover, the control circuit 427 detects the writing pressure detected in the writing pressure detector 5 of the electronic pen 10C.

In the electronic pen 10C of this example, the signal transmitting circuit 43 of the circuit board 4C is provided with a configuration of only the oscillating circuit and transmits the writing pressure to the position detecting device as change in the oscillation frequency. However, the configuration is not limited thereto. A signal generating circuit may be configured with the oscillating circuit and a circuit that carries out predetermined modulation for an oscillated signal thereof and may transmit writing pressure information to the position detecting device as an amplitude shift keying (ASK) signal or the like for example.

As described above, according to the third embodiment, it is possible to implement an electronic pen of the capacitive coupling system that has high performance of dust resistance and water resistance and has also the writing pressure detection function.

In the case of the electronic pen of the capacitive coupling system in the third embodiment, as the generating circuit of the drive power supply of the signal transmitting circuit, the electric double-layer capacitor as an example of an internal power storage element is charged by electromagnetic induction by winding a coil around a magnetic core. However, the configuration is not limited thereto. For example, it is obvious that a configuration to transmit a power supply by electric field coupling or radio waves and store power in a power storage element housed in the electronic pen main unit of an electronic pen may be used.

Another Embodiment and Another Modification Example

In the above-described embodiments, the electronic pen main unit including the electronic pen main unit casing (internal casing) is housed in the hollow part of the external casing. Then, the components for the electronic pen are housed in the hollow part of the electronic pen main unit casing (internal casing) and the hollow part of this electronic pen main unit casing (internal casing) is filled with a resin.

However, it is also possible for the electronic pen main unit in the electronic pen according to the present disclosure to have a configuration in which the electronic pen main unit casing (internal casing) is not included and the components for the electronic pen are molded by a resin.

Figure 9A:
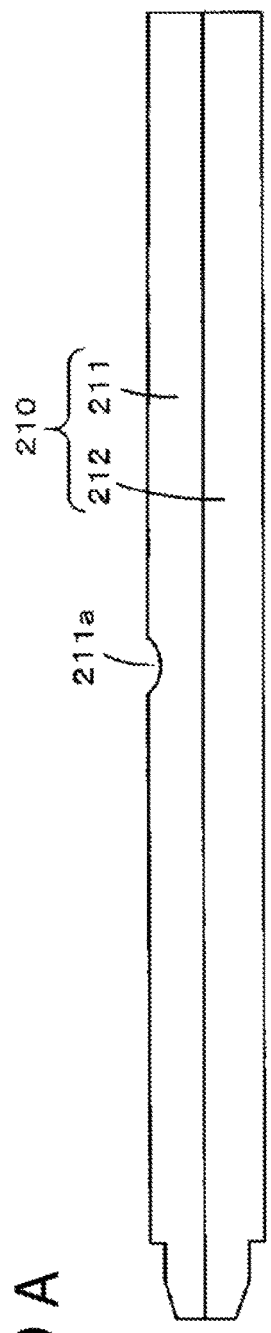
FIGS. 9A to 9C are diagrams for explaining a method for manufacturing an electronic pen main unit of an electronic pen according to another embodiment of the present disclosure.
Figure 9B:
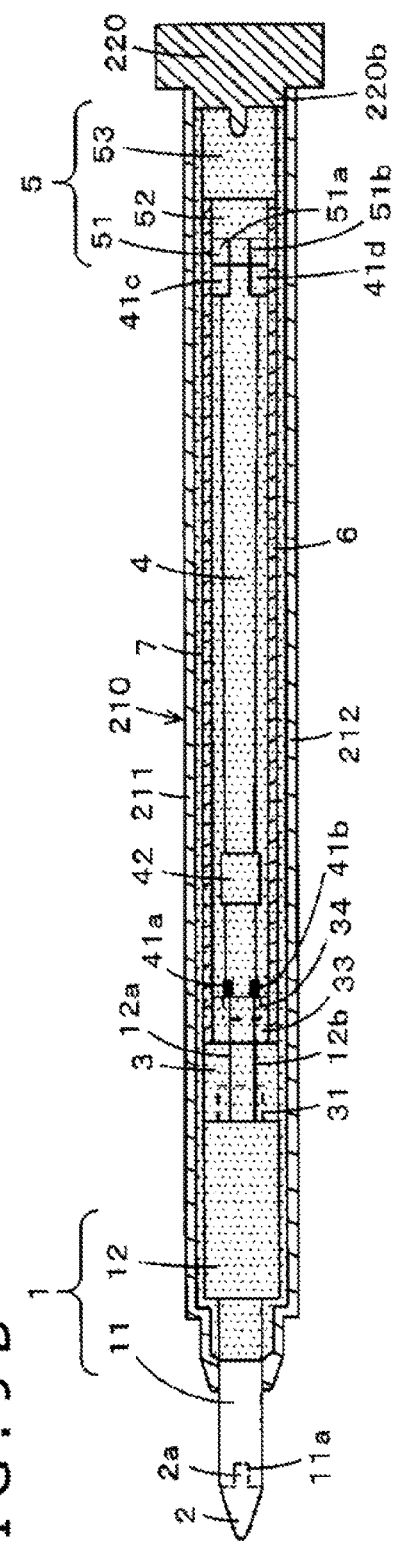
Figure 9C:
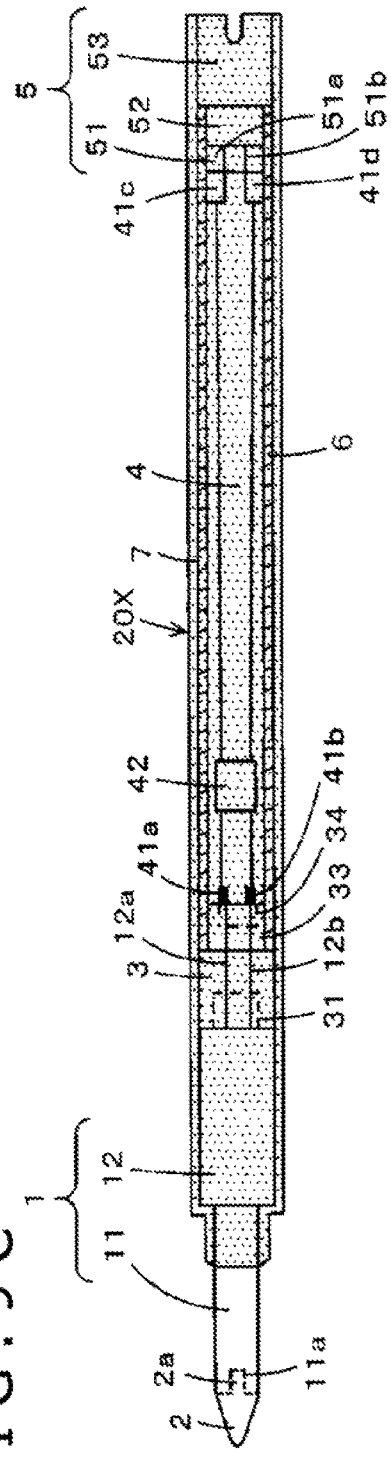

FIGS. 9A to 9C are diagrams for explaining a method for manufacturing the electronic pen main unit provided with the configuration in which the electronic pen main unit casing (internal casing) is not included and the components for the electronic pen are molded by a resin. The example of these FIGS. 9A to 9C is the case in which component constituent elements as the electronic pen are the same as the electronic pen 10 of the first embodiment, and the same constituent component as the electronic pen 10 is given the same reference symbol.

In this example, a mold member 210 for molding like one depicted in FIG. 9A is prepared. In this example, the mold member 210 for molding includes half members 211 and 212 each having a half pipe shape obtained by bisecting the electronic pen main unit casing (internal casing) 201 of the electronic pen main unit 20 by a cutting plate in the direction along the axial center direction thereof. A resin loading hole 211a for pouring a molten resin is formed in one half member, the half member 211 in this example.

Furthermore, in this example, a module component obtained by lining up the coil unit 1, the connecting member 3, the circuit board 4, the board protection pipe 6, and the writing pressure detector 5 in the axial center direction to join and integrate them is housed in the other half member 212 of the mold member 210 for molding. Then, the half member 211 is joined to the half member 212 and the state in which the above-described module component is housed in the hollow part of the mold member 210 for molding is made (see FIG. 9B).

Moreover, the opening of the mold member 210 for molding on the opposite side to the core body tip member 2 is closed by a jig 220 for resin filling having the same configuration as the casing lid 102. If the height, in the axial center direction, of a small-diameter part 220b of the jig 220 for resin filling corresponding to the small-diameter part 102b of the casing lid 102 is set identical to that of the small-diameter part 102b of the casing lid 102, the above-described gap δ is not formed between the pressure sensing part 53 and the small-diameter part 102b of the casing lid 102. Therefore, the height of the small-diameter part 220b of the jig 220 for resin filling in the axial center direction is set larger by the gap δ than the height of the small-diameter part 220b corresponding to the small-diameter part 102b of the casing lid 102 in the axial center direction.

Furthermore, the gap between the outer circumference of the opening of the mold member 210 for molding and the ferrite core 11 that forms the core body is closed by putty or the like.

Then, a molten resin is poured from the resin loading hole 211a formed in the half member 211 of the mold member 210 for molding into the hollow part of the mold member 210 for molding and the hollow part of the mold member 210 for molding is filled with the resin 7 as depicted by halftone dots in FIG. 9B.

Then, after the resin 7 is solidified, the half member 211 and the half member 212 of the mold member 210 for molding are removed. Thereby, as depicted in FIG. 9C, an electronic pen main unit 20X is formed in which the module component obtained by lining up the coil unit 1, the connecting member 3, the circuit board 4, the board protection pipe 6, and the writing pressure detector 5 in the axial center direction to join and integrate them is covered and molded by the resin 7.

The electronic pen main unit 20X formed as above is housed in the hollow part of the external casing 101 depicted in FIG. 1 and the external casing 101 is sealed by the casing lid 102. This can form the electronic pen of this example.

Another Example of Writing Pressure Detector

Figure 10:
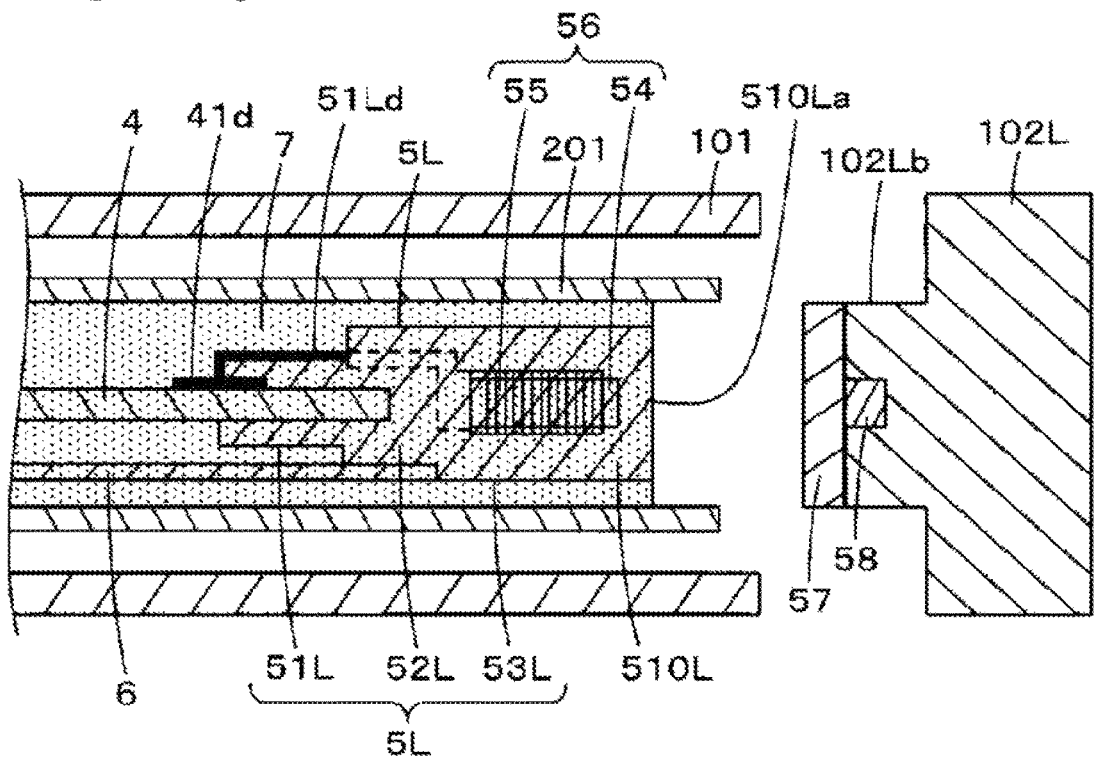
FIG. 10 is a diagram for explaining part of an electronic pen main unit of an electronic pen according to another embodiment of the present disclosure.

In the above-described embodiment, for the writing pressure detector that forms the pressure detector, the pressure sensing chip that detects the applied writing pressure as change in the capacitance is used. However, the writing pressure detector is not limited to the configuration that detects the applied writing pressure as change in the capacitance. An example of FIG. 10 is one example of a configuration that detects the applied writing pressure as change in the inductance. In this example of FIG. 10, the same constituent part as the above-described first embodiment is given the same reference symbol.

Also in this example, as depicted in FIG. 10, a writing pressure detector 5L includes a connection terminal part 51L joined to the circuit board 4, a fitting part 52L fitted to the board protection pipe 6, and a pressure sensing part 53L. However, in a package 510L of the pressure sensing part 53L, a coil member 56 obtained by winding a coil 55 around a magnetic core, e.g. a ferrite core 54, is housed.

As depicted in FIG. 10, in this example, the coil member 56 in which the coil 55 is wound around the ferrite core 54 is housed in the package 510L of the pressure sensing part 53L in such a manner that the axial center direction of the ferrite core 54 becomes the axial center direction of the electronic pen main unit casing 201. Furthermore, the coil member 56 is provided in such a manner that an end surface of the ferrite core 54 in the axial center direction exists inside the package 510L relative to an upper end surface 510La of the package 510L.

Meanwhile, in this example, an elastic member 57 composed of e.g. elastic rubber is provided to be stuck to the surface that abuts against the upper end surface 510La of the package 510L of the pressure sensing part 53L of the writing pressure detector 5L in a small-diameter part 102Lb of a casing lid 102L. Furthermore, a magnetic body, e.g. a permanent magnet 58, magnetically coupled to the ferrite core 54 is provided in the small-diameter part 102Lb of the casing lid 102L. Therefore, the permanent magnet 58 provided in the small-diameter part 102Lb of the casing lid 102L is opposed to the coil member 56 of the writing pressure detector 5L with the intermediary of the elastic member 57.

In this case, based on application of a writing pressure to the core body tip member 2, the whole of the electronic pen main unit is displaced toward the casing lid 102L through the elastic member 57. Due to this, the distance between the ferrite core 54 and the coil 55 of the coil member 56 and the permanent magnet 58 changes and the inductance value based on both changes according to the writing pressure.

Figure 11A:
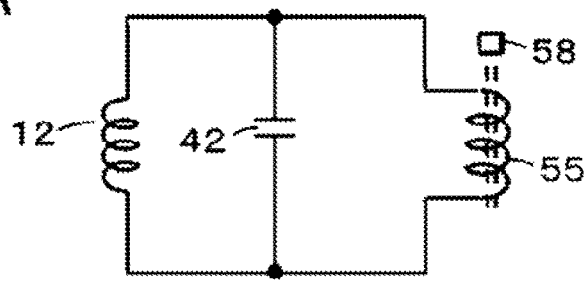
FIGS. 11A and 11B are diagrams for explaining electronic circuit configuration examples of electronic pen main units when the example of FIG. 10 is used.

In this example, as depicted in FIG. 11A, the coil 55 of the coil member 56 is connected in parallel to the coil 12 and the capacitor 42 and a parallel resonant circuit is formed. Therefore, in the case of this example, the resonant frequency of the resonant circuit changes due to the change in the inductance value based on the change in the distance between the coil member 56 and the permanent magnet 58 according to the writing pressure, and the writing pressure can be detected in the position detecting device 300 as this change in the resonant frequency similarly to the case of the first embodiment.

Figure 11B:
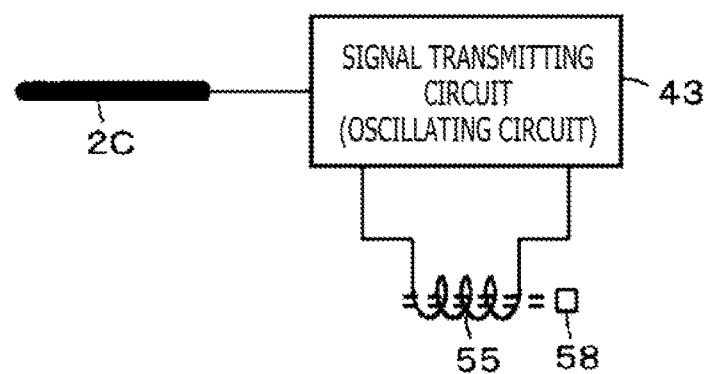

This example of FIG. 10 can be applied also to the electronic pen main unit 20C of the electronic pen 10C of the capacitive coupling system in the third embodiment. In this case, as depicted in FIG. 11B, the coil 55 is connected to become part of the resonant circuit for deciding the oscillation frequency of the signal transmitting circuit 43. Therefore, the position detecting device 400 can detect the writing pressure applied to the electronic pen similarly to the electronic pen 10C of the capacitive coupling system in the third embodiment.

The magnetic body that is provided in the small-diameter part 102Lb of the casing lid 102L and is magnetically coupled to the ferrite core 54 is not limited to the permanent magnet 58 in the above-described example and may be a magnetic piece such as a ferrite piece for example.

It is to be noted that the embodiment of the present disclosure is not limited to the foregoing embodiments, and that various changes can be made without departing from the spirit of the present disclosure.

What is claimed is:

1. An electronic pen comprising:
an electronic pen circuit and a core body disposed in a tubular external casing having a first end and a second end, the first end being opposite the second end; and
a circuit board disposed in the external casing and on which at least part of the electronic pen circuit is disposed, wherein:
the electronic pen circuit and the circuit board are housed in a portion of a tubular internal casing,
the tubular internal casing is housed in the external casing,
the core body is housed in the internal casing and the portion of the internal casing is filled with a resin in a state in which a tip part of the core body protrudes outside of the internal casing from a first opening of the internal casing on a first side of the internal casing in an axial center direction of the internal casing adjacent to the first end of the external casing,
the electronic pen circuit includes a magnetic core and a coil wound around the magnetic core, and
at least the coil wound around the magnetic core and an electrical connection part between the coil and the circuit board are disposed in the portion of the internal casing filled with the resin.

2. The electronic pen according to claim 1, wherein:
the electronic pen circuit includes a pressure detector which, in operation, detects a pressure applied to the tip part of the core body,
the pressure detector is disposed adjacent to a second opening of the internal casing on a second side of the internal casing in the axial center direction of the internal casing adjacent to the second end of the external casing, and
the pressure detector detects the pressure applied to the tip part of the core body by detecting an electrical quantity that changes based on displacement of the entire internal casing toward the second end of the external casing according to the pressure.

3. The electronic pen according to claim 2, wherein the pressure detector includes an elastic member joined to a member provided at the second end of the external casing.

4. The electronic pen according to claim 3, wherein the pressure detector includes a semiconductor device that detects a pressure received through the elastic member by detecting a capacitance as the electrical quantity.

5. The electronic pen according to claim 2, wherein an elastic member is provided between an exposed end surface of the internal casing adjacent to the second opening of the internal casing and a member provided on the external casing at the second end of the external casing, and the entire internal casing is displaceable toward the second end of the external casing through the elastic member according to the pressure applied to the tip part of the core body.

6. The electronic pen according to claim 5, wherein:
the pressure detector detects an inductance as the electrical quantity and includes the coil wound around the magnetic core,
a magnetic body separate from the magnetic core of the pressure detector in the internal casing is disposed adjacent to the second end of the external casing, and
the elastic member is disposed between the magnetic core and the magnetic body.

7. The electronic pen according to claim 2, wherein a knock-type mechanism is provided at the second end of the external casing and the internal casing is joined to the knock-type mechanism on the second side of the internal casing.

8. The electronic pen according to claim 7, wherein a plurality of the internal casings is provided in the external casing and each of the internal casings is joined to the knock-type mechanism.

9. The electronic pen according to claim 1, wherein:
the magnetic core does not have a through-hole in the axial center direction, and
a part around which the coil is not wound of the magnetic core protrudes outside of the internal casing from the first opening of the internal casing and forms at least part of the core body.

10. The electronic pen according to claim 1, wherein a capacitor that is connected to the coil and forms a resonant circuit is provided on the circuit board.

11. The electronic pen according to claim 1, wherein:
the magnetic core has a through-hole in which the core body is inserted, and
the entire magnetic core is disposed in the portion of the internal casing filled with the resin in such a manner that only part of the core body protrudes outside of the internal casing from the first opening of the internal casing.

12. The electronic pen according to claim 1, wherein:
the core body includes a conductor,
a signal transmitting circuit is formed on the circuit board,
the core body and the signal transmitting circuit are electrically connected and, in operation, a signal from the signal transmitting circuit is sent out through the core body, and
an electrical connection part between the core body and the signal transmitting circuit is disposed in the portion of the internal casing filled with the resin.

13. An electronic pen main unit housed in a tubular external casing having a first end and a second end, the first end being opposite the second end, the electronic pen main unit comprising:
an electronic pen and a core body disposed in a portion of a tubular electronic pen main unit casing; and
a circuit board disposed in the portion of the electronic pen main unit casing and on which at least part of the electronic pen circuit is disposed,
wherein the core body is housed in the electronic pen main unit casing and the portion of the electronic pen main unit casing is filled with a resin in a state in which a tip part of the core body protrudes outside of the electronic pen main unit casing from a first opening of the electronic pen main unit casing on a first side of the electronic pen main unit casing in an axial center direction of the electronic pen main unit casing adjacent to the first end of the external casing,
wherein the electronic pen circuit includes a magnetic core and a coil wound around the magnetic core, and
wherein at least the coil wound around the magnetic core and an electrical connection part between the coil and the circuit board are disposed in the portion of the internal casing filled with the resin.

14. The electronic pen main unit according to claim 13, wherein:
the electronic pen circuit includes a pressure detector which, in operation, detects a pressure applied to the tip part of the core body,
the pressure detector is disposed adjacent to a second opening of the electronic pen main unit casing on a second side of the electronic pen main unit casing in the axial center direction of the electronic pen main unit casing, the first side of the electronic pen main unit casing being opposite the second side of the electronic pen main unit casing, and
the pressure detector detects the pressure applied to the tip part of the core body by detecting an electrical quantity that changes based on displacement of the entire electronic pen main unit casing toward the second end of the external casing according to the pressure.

15. An electronic pen main unit housed in a tubular external casing having a first end and a second end, the first end being opposite the second end, the electronic pen main unit comprising:
an electronic pen circuit and a core body covered by a resin except for a first side of the core body at which an exposed tip part is disposed adjacent to the first end of the external casing; and
a circuit board that is at least partially covered by the resin and on which at least part of the electronic pen circuit is disposed, wherein:
the electronic pen circuit includes a pressure detector which, in operation, detects a pressure applied to the tip part of the core body,
the pressure detector is disposed on a second side of the core body, the second side of the core body being opposite to the first side of the core body at which the exposed tip part is disposed,
the pressure detector detects the pressure applied to the tip part of the core body by detecting an electrical quantity that changes based on displacement of the entire electronic pen main unit toward the second end of the external casing according to the pressure,
the electronic pen circuit includes a magnetic core and a coil wound around the magnetic core, and
at least the coil wound around the magnetic core and an electrical connection part between the coil and the circuit board are disposed in the portion of the internal casing filled with the resin.

* * * * *